(12) United States Patent
Huber et al.

(10) Patent No.: US 10,059,828 B2
(45) Date of Patent: Aug. 28, 2018

(54) HIGHLY FILLED POLYURETHANE COMPOSITIONS

(71) Applicant: SIKA TECHNOLOGY AG, Baar (CH)

(72) Inventors: Dominik Huber, Winterthur (CH); Fabian Real, Wetzikon (CH)

(73) Assignee: SIKA TECHNOLOGY AG, Baar (CH)

( * ) Notice: Subject to any disclaimer, the term of this patent is extended or adjusted under 35 U.S.C. 154(b) by 129 days.

(21) Appl. No.: 15/108,870

(22) PCT Filed: Jan. 9, 2015

(86) PCT No.: PCT/EP2015/050342
§ 371 (c)(1),
(2) Date: Jun. 29, 2016

(87) PCT Pub. No.: WO2015/104379
PCT Pub. Date: Jul. 16, 2015

(65) Prior Publication Data
US 2016/0326342 A1 Nov. 10, 2016

(30) Foreign Application Priority Data
Jan. 13, 2014 (EP) .................................... 14150973

(51) Int. Cl.
| | |
|---|---|
| *C08K 5/10* | (2006.01) |
| *C08K 5/00* | (2006.01) |
| *C08G 18/10* | (2006.01) |
| *C08G 18/12* | (2006.01) |
| *C08K 3/26* | (2006.01) |
| *C09D 175/04* | (2006.01) |
| *C09J 175/04* | (2006.01) |
| *C08K 3/013* | (2018.01) |

(52) U.S. Cl.
CPC ................ *C08K 5/10* (2013.01); *C08G 18/10* (2013.01); *C08G 18/12* (2013.01); *C08K 3/013* (2018.01); *C08K 3/26* (2013.01); *C08K 5/0016* (2013.01); *C09D 175/04* (2013.01); *C09J 175/04* (2013.01); *C08K 2003/265* (2013.01)

(58) Field of Classification Search
CPC ................................. C08K 5/10; C08G 18/10
See application file for complete search history.

(56) References Cited

U.S. PATENT DOCUMENTS

| | | | |
|---|---|---|---|
| 2009/0110937 A1 | 4/2009 | Onuoha | |
| 2009/0202837 A1 | 8/2009 | Onuoha et al. | |
| 2011/0253277 A1 | 10/2011 | Mueller et al. | |
| 2012/0253001 A1* | 10/2012 | Radhakrishnan ...... | C08G 18/10 528/85 |
| 2014/0364527 A1 | 12/2014 | Wintermantel et al. | |
| 2015/0166859 A1* | 6/2015 | Choffat .................. | C08G 18/10 524/315 |

FOREIGN PATENT DOCUMENTS

| | | |
|---|---|---|
| CN | 101400714 A | 4/2009 |
| CN | 101848953 A | 9/2010 |
| EP | 1281740 A1 | 2/2003 |
| EP | 1873222 A1 | 1/2008 |
| EP | 2017260 A1 | 1/2009 |
| WO | 02/48228 A2 | 6/2002 |
| WO | 2009/061580 A1 | 5/2009 |
| WO | 2013/092564 A1 | 6/2013 |

OTHER PUBLICATIONS

Mar. 11, 2015 International Search Report issued in International Patent Application No. PCT/EP2015/050342.
Jan. 17, 2018 Office Action issued in Chinese Application No. 201580004402.1.

* cited by examiner

*Primary Examiner* — Arrie L Reuther
(74) *Attorney, Agent, or Firm* — Oliff PLC

(57) ABSTRACT

A moisture-curing composition containing a) 5 to 20 wt. % of at least one isocyanate-functional polymer, b) 7 to 20 wt. % of rapeseed oil methyl ester and c) 70 to 88 wt. % of at least one filler, based on the total composition. Compositions are suitable in particular as adhesive, sealant or coating, and preferably as a parquet adhesive or joint sealing material.

15 Claims, No Drawings

HIGHLY FILLED POLYURETHANE COMPOSITIONS

TECHNICAL FIELD

The invention relates to moisture-curing compositions based on polyurethane and having a very high filler content, suitable as adhesives, sealants or coatings.

PRIOR ART

Moisture-curing compositions based on polyurethanes have been known for some considerable time and the uses thereof include elastic adhesive bonds or seals.

In such applications, compositions of this kind are readily formulated as one-pack compositions, which can be applied from various containers (e.g., cartridges) directly and without admixing of further required constituents, and which cure with moisture. In the majority of cases this is atmospheric moisture, reacting with the reactive polyurethane constituents of the compositions and resulting in the cross-linking and the full curing of the composition.

The respective compositions may vary very greatly depending on the field of application, and have in some cases very different final properties, such as mechanical properties, for example, but in the majority of cases comprise at least one moisture-reactive polyurethane polymer and at least one filler. The filler here has various functions. First, it influences the mechanical properties of the fully cured composition, such as strength, extensibility or hardness.

Secondly, the filler often constitutes one of the most cost-effective components of a composition, with more highly filled compositions usually having much lower production costs than their counterparts with low degrees of filling.

There are upper limits, however, on the use of fillers in polyurethane compositions. On the one hand, the mechanical properties of compositions with excessive degrees of filling suffer after curing, as manifested, for example, in low elongations at break. As a result, for example, such compositions can no longer be used for the extensible sealing of connecting joints or movement joints. On the other hand, moreover, the processing qualities of highly filled polyurethane compositions are often adversely affected. In particular it must be accepted that, with a high filler content, the compositions undergo extreme thickening and can be applied subsequently only with very great force employed, such as from cartridges, for example, with manual gun application no longer being possible at all in extreme cases. Furthermore, an excessively high filler content may also result in the compositions no longer being stable, because, for example, water present in the filler is able to react with the polyurethane polymers and leads to curing within the container itself.

EXPOSITION OF THE INVENTION

It is an object of the present invention, therefore, to provide a highly filled, preferably one-pack, moisture-curing composition based on polyurethanes that possesses good mechanical properties in the fully cured state and exhibits no substantial deterioration in the application properties or storage stability.

Surprisingly it has now been found that compositions according to claim 1 achieve this object. They include a filler content of at least 70 percent by weight, a level which is considered to be extremely high filling.

In the fully cured state, compositions of the invention have good mechanical properties such as elongation at break and, surprisingly, can be processed easily in the uncured state.

Moreover, compositions of the invention have the advantage that, in view of the extremely high filler content, they are inexpensively available.

Further aspects of the invention are the subject of further independent claims. Particularly preferred embodiments of the invention are the subject of the dependent claims.

CERTAIN EMBODIMENTS OF THE INVENTION

A subject of the present invention is a moisture-curing composition comprising:
a) 5 wt % to 20 wt % of at least one isocyanate-functional polymer,
b) 7 wt % to 20 wt % of rapeseed oil methyl ester, and
c) 70 wt % to 88 wt % of at least one filler, based on the overall composition.

Substance names beginning with "poly", such as polyol or polyisocyanate, in the present document identify substances which formally contain two or more per molecule of the functional groups that occur in their name.

The term "polymer" in the present document encompasses on the one hand a collective of chemically uniform macromolecules which nevertheless differ in respect of degree of polymerization, molar mass, and chain length, which collective has been prepared through a polymerization reaction (chain growth addition polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically nonuniform. The term, moreover, further embraces what are called prepolymers, these being reactive oligomeric preadducts whose functional groups have participated in the construction of macromolecules.

The term "polyurethane polymer" encompasses all polymers which are prepared by the process known as the diisocyanate polyaddition process. This also includes those polymers which are virtually or entirely free from urethane groups. Examples of polyurethane polymers are polyether-polyurethanes, polyester-polyurethanes, polyether-polyureas, polyureas, polyester-polyureas, polyisocyanurates, and polycarbodiimides.

"Molecular weight" is understood in the present document to refer to the molar mass (in grams per mole) of a molecule. The "average molecular weight" is the number average $M_n$ of an oligomeric or polymeric mixture of molecules, and is determined customarily by means of gel permeation chromatography (GPC) against polystyrene as standard. "Room temperature" in the present document is a temperature of 23° C.

Examples of suitable polyurethane polymers containing isocyanate groups for producing a composition of the invention include polymers obtainable by the reaction of at least one polyol with at least one polyisocyanate, more particularly a diisocyanate. This reaction may be accomplished by reacting the polyol and the polyisocyanate by customary processes, as for example at temperatures of 50° C. to 100° C., optionally with accompanying use of suitable catalysts, with the polyisocyanate being metered such that its isocyanate groups are present in a stoichiometric excess in relation to the hydroxyl groups of the polyol.

The excess of polyisocyanate is selected more particularly such that in the resulting polyurethane polymer, after the reaction of all the hydroxyl groups of the polyol, the remaining free isocyanate group content is from 0.1 to 5 wt %, preferably 0.1 to 2.5 wt %, more preferably 0.2 to 1 wt %, based on the overall polymer.

The polyurethane polymer may optionally be prepared with accompanying use of plasticizers, in which case the plasticizers used contain no isocyanate-reactive groups.

Preferred polyurethane polymers are those with the stated free isocyanate group content that are obtained from the reaction of diisocyanates with high molecular weight diols in an NCO:OH ratio of 1.5:1 to 2.2:1.

Suitable polyols for preparing the polyurethane polymer are, in particular, polyether polyols, polyester polyols, and polycarbonate polyols, and also mixtures of these polyols.

Especially suitable polyether polyols, also called polyoxyalkylene polyols or oligoetherols, are those which are polymerization products of ethylene oxide, 1,2-propylene oxide, 1,2- or 2,3-butylene oxide, oxetane, tetrahydrofuran, or mixtures thereof, optionally polymerized with the aid of a starter molecule having two or more active hydrogen atoms, such as water, ammonia, for example, or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the stated compounds. Use may be made both of polyoxyalkylene polyols which have a low degree of unsaturation (measured by ASTM D-2849-69 and expressed in milliequivalents of unsaturation per gram of polyol (meq/g)), prepared for example by means of double metal cyanide complex catalysts (DMC catalysts), and of polyoxyalkylene polyols having a higher degree of unsaturation, prepared for example by means of anionic catalysts such as NaOH, KOH, CsOH, or alkali metal alkoxides.

Particularly suitable are polyoxyethylene polyols and polyoxypropylene polyols, more particularly polyoxyethylene diols, polyoxypropylene diols, polyoxyethylene triols, and polyoxypropylene triols.

Especially suitable are polyoxyalkylene diols or polyoxyalkylene triols having a degree of unsaturation of less than 0.02 meq/g and having a molecular weight in the range from 1000 to 30 000 g/mol, and also polyoxyethylene diols, polyoxyethylene triols, polyoxypropylene diols, and polyoxypropylene triols having a molecular weight of 400 to 20 000 g/mol.

Likewise particularly suitable are so-called ethylene oxide-terminated ("EO-endcapped", ethylene oxide-endcapped) polyoxypropylene polyols. The latter are special polyoxypropylene-polyoxyethylene polyols which are obtained, for example, by subjecting pure polyoxypropylene polyols, more particularly polyoxypropylene diols and triols, to further alkoxylation with ethylene oxide after the end of the polypropoxylation reaction, and which therefore have primary hydroxyl groups. Preferred in this case are polyoxypropylene-polyoxyethylene diols and polyoxypropylene-polyoxyethylene triols. Additionally suitable are hydroxyl group terminated polybutadiene polyols, examples being those prepared by polymerization of 1,3-butadiene and allyl alcohol or by oxidation of polybutadiene, and their hydrogenation products. Additionally suitable are styreneacrylonitrile grafted polyether polyols, of the kind available commercially, for example, under the tradename Lupranol® from Elastogran GmbH, Germany.

Especially suitable as polyester polyols are polyesters which carry at least two hydroxyl groups and are prepared by known processes, particularly by the polycondensation of hydroxycarboxylic acids or the polycondensation of aliphatic and/or aromatic polycarboxylic acids with dihydric or polyhydric alcohols.

Especially suitable polyester polyols are those prepared from di- to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane, or mixtures of the aforesaid alcohols, with organic dicarboxylic acids or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid, and trimellitic anhydride, or mixtures of the aforesaid acids, and also polyester polyols of lactones such as ε-caprolactone, for example.

Particularly suitable are polyester diols, especially those prepared from adipic acid, azelaic acid, sebacic acid, dodecanedicarboxylic acid, dimer fatty acid, phthalic acid, isophthalic acid, and terephthalic acid as dicarboxylic acid, or from lactones such as ε-caprolactone, for example, and from ethylene glycol, diethylene glycol, neopentyl glycol, 1,4-butanediol, 1,6-hexanediol, dimer fatty acid diol, and 1,4-cyclohexanedimethanol as dihydric alcohol.

Especially suitable polycarbonate polyols are those obtainable by reaction, for example, of the abovementioned alcohols, used for synthesis of the polyester polyols, with dialkyl carbonates such as dimethyl carbonate, diaryl carbonates such as diphenyl carbonate, or phosgene. Particularly suitable are polycarbonate diols, especially amorphous polycarbonate diols.

Other suitable polyols are poly(meth)acrylate polyols.

Additionally suitable are polyhydroxy-functional fats and oils, examples being natural fats and oils, more particularly castor oil, or so-called oleochemical polyols, obtained through chemical modification of natural fats and oils, the epoxy polyesters and epoxy polyethers that are obtained, for example, by epoxidation of unsaturated oils and subsequent ring opening with carboxylic acids or with alcohols, respectively, or polyols obtained by hydroformylation and hydrogenation of unsaturated oils. Further suitable are polyols obtained from natural fats and oils by degradation processes such as alcoholysis or ozonolysis and subsequent chemical linkage, by transesterification or dimerization, for example, of the resultant degradation products or derivatives thereof. Especially suitable degradation products of natural fats and oils are fatty acids and fatty alcohols and also fatty acid esters, more particularly the methyl esters (FAME), which may be derivatized, for example, by hydroformylation and hydrogenation to form hydroxy-fatty acid esters.

Likewise suitable, moreover, are polyhydrocarbon polyols, also called oligohydrocarbonols, examples being polyhydroxy-functional ethylene-propylene, ethylene-butylene or ethylene-propylene-diene copolymers, as produced for example by Kraton Polymers, USA, or polyhydroxy-functional copolymers of dienes such as 1,3-butanediene or diene mixtures and vinyl monomers such as styrene, acrylonitrile or isobutylene, or polyhydroxy-functional polybutadiene polyols, examples being those which are prepared by copolymerization of 1,3-butadiene and allyl alcohol and which may also have been hydrogenated.

Additionally suitable are polyhydroxy-functional acrylonitrile/butadiene copolymers of the kind preparable, for example, from epoxides or amino alcohols and carboxyl-terminated acrylonitrile/butadiene copolymers, which are available commercially under the name Hypro® CTBN from Emerald Performance Materials, LLC, USA.

These stated polyols preferably have an average molecular weight of 250 to 30 000 g/mol, more particularly of 1000 to 30 000 g/mol, and an average OH functionality in the range from 1.6 to 3.

Particularly suitable polyols are polyester polyols and polyether polyols, more particularly polyoxyethylene polyol, polyoxypropylene polyol, and polyoxypropylene-polyoxyethylene polyol, preferably polyoxyethylene diol, polyoxypropylene diol, polyoxyethylene triol, polyoxypropylene triol, polyoxypropylene-polyoxyethylene diol, and polyoxypropylene-polyoxyethylene triol.

Further to these stated polyols it is possible as well to use small amounts of low molecular weight dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher alcohols, low molecular weight alkoxylation products of the aforesaid dihydric and polyhydric alcohols, and also mixtures of the aforesaid alcohols, when preparing the polyurethane polymer having terminal isocyanate groups.

As polyisocyanates for the preparation of the polyurethane polymer it is possible to use commercially customary polyisocyanates, more particularly diisocyanates.

Suitable diisocyanates by way of example are 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPD1), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, 2,4- and 2,6-tolylene diisocyanate (TDI), 4,4'-, 2,4'-, and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), oligomers and polymers of the aforementioned isocyanates, and also any desired mixtures of the aforementioned isocyanates.

In the composition of the invention the isocyanate-functional polymer is present in an amount of 5 to 20 wt %, more particularly in an amount of 7 to 20 wt %, preferably 9 to 18 wt %, more preferably 10 to 16 wt %, based on the overall composition.

Furthermore, the composition of the invention, especially as a one-pack composition, may also comprise one or more so-called latent curing agents. These are chemically or physically blocked amines which undergo hydrolysis, preferably under the influence of moisture, with elimination of aldehydes, for example, to form free amines and which are able thereafter to react with the isocyanates to form a urea bond, Latent curing agents of this kind are known to the person skilled in the art and are used, for example, to prevent unwanted formation of bubbles in the composition as it cures, since the use of latent curing agents suppresses the direct reaction of water with isocyanates (likewise to give amines, accompanied by elimination of gaseous $CO_2$). Suitable latent amines are, for example, aldimines, ketimines, enamines, oxazolidines, amines microencapsulated or adsorbed to a zeolite, and amine-metal complexes. These molecules preferably possess two or more amine functions, in order to allow twin-ended reaction with the isocyanate-functional polymers, with an increase in the length of the molecular chain.

Particularly suitable as latent curing agents are aldimines, which are described in EP 2 017 260 A1, for example.

Examples of suitable aldimines are N,N'-bis(2,2-dimethyl-3-lauroyloxypropylidene)-3-aminomethyl-3,5,5-trimethylcyclohexylamine, N,N'-bis(2,2-dimethyl-3-lauroyloxypropylidene)hexamethylene-1,6-diamine, N,N'-bis(2,2-dimethyl-3-lauroyloxypropylidene) polyoxypropylenediamines having an average molecular weight $M_n$ in the range from 600 to 900 g/mol, N,N',N''-tris(2,2-dimethyl-3-lauroyloxypropylidene)polyoxypropylenetriamines having an average molecular weight $M_n$ in the range of 1000 to 1500 g/mol, N,N'-bis(benzylidene)polyoxypropylenediamines having an average molecular weight $M_n$ in the range from 300 to 500 g/mol, N,N'-bis(isobutylidene)-3-aminomethyl-3,5,5-trimethylcyclohexylamine, available commercially as Vestamin® A-139 (from Evonik Industries AG, Germany), N,N'-bis(2,2-dimethyl-3-(N-morpholino)propylidene)-3-aminomethyl-3,5,5-trimethylcyclohexylamine, N,N'-bis(2,2-dimethyl-3-(N-morpholino)propylidene)hexamethylene-1,6-diamine, N,N'-bis(2,2-dimethyl-3-(N-morpholino)propylidene) polyoxypropylenediamine having an average molecular weight $M_n$ in the range from 400 to 600 g/mol, N,N',N''-tris(2,2-dimethyl-3-(N-morpholino)propylidene)polyoxypropylene-triamine having an average molecular weight $M_n$ in the range from 800 to 1000 g/mol.

Likewise suitable as latent curing agents are oxazolidines, more particularly bisoxazolidines, such as, in particular, commercially available products such as Härter OZ curing agent (from Bayer MaterialScience AG, Germany), Zoldine® RD-4 (from Angus Chemical Co, USA), and also Incozol® LV, Incozol® 4, Incozol® HP, Incozol® NC, Incozol® CF, Incozol® EH, and Incozol® K (from Incorez Ltd, UK).

The composition of the invention may further comprise at least one catalyst which accelerates the hydrolysis of the latent curing agent. Particularly if aldimines are used as latent curing agents, preferred such catalysts are acids, examples being organic carboxylic acids such as benzoic acid, salicylic acid or 2-nitrobenzoic acid, organic carboxylic anhydrides such as phthalic anhydride or hexahydrophthalic anhydride, silyl esters of organic carboxylic acids, organic sulfonic acids such as methanesulfonic acid, p-toluenesulfonic acid or 4-dodecylbenzenesulfonic acid, or other organic or inorganic acids, and also mixtures of the aforesaid acids or acid esters. Likewise suitable are metal compounds, examples being tin compounds, as for example dialkyltin dicarboxylates such as dibutyltin diacetate, dibutyltin bis(2-ethylhexanoate), dibutyltin dilaurate, dibutyltin dipalmitate, dibutyltin distearate, dibutyltin dioleate, dibutyltin dilinoleate, dibutyltin dilinolenate, dibutyltin diacetylacetonate, dibutyltin maleate, dibutyltin bis(octyl maleate), dibutyltin phthalate, dimethyltin dilaurate, dioctyltin diacetate or dioctyltin dilaurate, dialkyltin mercaptides such as dibutyltin bis(2-ethylhexyl mercaptoacetate) or dioctyltin bis(2-ethylhexyl mercaptoacetate), dibutyltin dichloride, monobutyltin trichloride, alkyltin thioesters, dibutyltin oxide, dioctyltin oxide, tin(II) carboxylates such as tin(II) octoate, tin(II) 2-ethylhexanoate, tin(II) laurate, tin(II) oleate or tin(II) naphthenate, stannoxanes such as laurylstannoxane, bismuth compounds such as bismuth(III) octoate, bismuth(III) neodecanoate or bismuth(III) oxinates; weakly basic tertiary amine compounds such as, for example, 2,2'-dimorpholinodiethyl ether and other morpholine ether derivatives; and also combinations of the stated compounds, especially of acids and metal compounds or of metal compounds and compounds containing amino groups.

Furthermore, the composition of the invention may comprise at least one catalyst for the crosslinking of isocyanate-functional polymers. This may be a catalyst which also catalyzes the above-described hydrolysis of the latent curing agent, or may be one or more other compounds.

More particularly, the suitable catalyst for the crosslinking of the isocyanate-functional polymers is a metal catalyst, as for example a metal complex, or is a nitrogen-containing compound.

Suitable metal catalysts are, for example, compounds of bismuth or tin, especially organotin compounds or organobismuth compounds, these metal catalysts, in particular, having alkoxy groups, sulfonate groups, carboxyl groups, dialkyl phosphate groups, dialkyl pyrophosphate groups, and diketonate groups.

Particularly suitable organotin compounds are dialkyltin oxides, dialkyltin dichlorides, dialkyltin dicarboxylates, and dialkyltin diketonates, more particularly dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate, and dioctyltin diacetylacetonate, and also alkyltin thioesters.

Particularly suitable bismuth compounds are bismuth trioctoate and bismuth tris(neodecanoate).

Other suitable metal catalysts are, for example, compounds of zinc, manganese, iron, chromium, cobalt, copper, nickel, molybdenum, lead, cadmium, mercury, antimony, vanadium, titanium, zirconium or potassium, such as zinc (II) acetate, zinc(II) 2-ethylhexanoate, zinc(II) laurate, zinc (II) oleate, zinc(II) naphthenate, zinc(II) acetylacetonate, zinc(II) salicylate, manganese(II) 2-ethylhexanoate, iron (III) 2-ethylhexanoate, iron(III) acetylacetonate, chromium (III) 2-ethylhexanoate, cobalt(II) naphthenate, cobalt(II) 2-ethylhexanoate, copper(II) 2-ethylhexanoate, nickel(II) naphthenate, phenylmercury neodecanoate, lead(II) acetate, lead(II) 2-ethylhexanoate, lead(II) neodecanoate, lead(II) acetylacetonate, aluminum lactate, aluminum oleate, aluminum(III) acetylacetonate, diisopropoxytitanium bis(ethyl acetoacetate), dibutoxytitanium bis(ethyl acetoacetate), dibutoxytitanium bis(acetylacetonate), potassium acetate, potassium octoate;

Nitrogen-containing compounds suitable as catalyst are, in particular, amines such as especially N-ethyldiisopropylamine, N,N,N',N'-tetramethylalkylene-diamines, polyoxyalkylenamines, 1,4-diazabicyclo[2.2.2]octane; amidines such as, in particular, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, in particular, tetramethylguanidine, 2-guanidinobenzimidazole, acetylacetoneguanidine, 1,3-di-o-tolylguanidine, 2-tert-butyl-1,1,3,3-tetramethylguanidine; and imidazoles such as, in particular, N-(3-trimethoxysilylpropyl)-4,5-dihydroimidazole and N-(3-triethoxysilylpropyl)-4,5-dihydroimidazole.

Especially suitable also are combinations of different catalysts, more particularly combinations of at least one metal catalyst and at least one nitrogen-containing compound.

Preferred as catalyst are organotin compounds, amines, amidines, guanidines, and imidazoles. Particularly preferred are organotin compounds and amidines. The fraction of any catalyst present in the composition of the invention is 0.001 to 0.5 wt %, preferably 0.005 to 0.15 wt %, especially 0.01 to 0.1 wt %, based on the overall composition.

The composition further comprises at least 70 wt % of at least one filler. The filler influences the rheological properties of the uncured composition and also the mechanical properties and the surface nature of the fully cured composition. Suitable fillers are inorganic and organic fillers, as for example natural, ground or precipitated chalks (which consist entirely or primarily of calcium carbonate), and which are optionally coated with fatty acids, more particularly stearic acid; barium sulfate ($BaSO_4$, also called barite or heavy spar), calcined kaolins, aluminum oxides, aluminum hydroxides, silicas, especially finely divided silicas from pyrolysis processes, carbon blacks, especially industrially manufactured carbon black, PVC powders, or hollow beads. Preferred fillers are calcium carbonates, calcined kaolins, carbon black, finely divided silicas, and flame-retardant fillers, such as hydroxides or hydrates, especially hydroxides or hydrates of aluminum, preferably aluminum hydroxide.

It is entirely possible and may even be an advantage to use a mixture of different fillers.

Very preferred as filler for the composition of the invention is chalk. Especially preferred is uncoated chalk, most preferably uncoated, ground chalk, as available for example under the name Omyacarb® 40 GU (Omya AG, Switzerland).

The fraction of filler is situated more particularly in the range from 70 to 80 wt %, preferably 70 to 77 wt %, based on the overall composition. Most preferably the composition comprises more from 71 wt % of filler, preferably 72 wt % or more, based on the overall composition.

The composition of the invention further comprises 7 to 20 wt % of rapeseed oil methyl ester, also called rapeseed methyl ester, often abbreviated to RME.

This is the product of esterification with methanol of various fatty acids of the preferably refined oil from the oilseed rape plant (*Brassica napus*) and less often of the related canola (*Brassica rapa* subsp. *oleifera*), and possibly of further related plants, which is obtained, for example, in a reaction of transesterification of the plant glycerol esters.

Rapeseed oil methyl ester is added, for example, to the engine fuel "biodiesel" and is available commercially, as for example from Oleon N.V., Belgium.

More particularly the fraction of rapeseed oil methyl ester in the composition of the invention is in the range from 8 to 18 wt %, preferably 9 to 15 wt %, more preferably 10 to 12 wt %, based on the overall composition.

The composition of the invention, moreover, may additionally comprise further constituents. Constituents of this kind by way of example are as follows:

- additional plasticizers, examples being esters of organic carboxylic acids or their anhydrides, phthalates, such as dioctyl phthalate or diisodecyl phthalate, adipates, such as dioctyl adipate, sebacates, polyols such as polyoxyalkylene polyols or polyester polyols, organic phosphoric and sulfonic esters, or polybutenes, for example;
- solvents, examples being ketones such as acetone, methyl ethyl ketone, diisobutyl ketone, acetonylacetate, mesityl oxide, and also cyclic ketones such as methylcyclohexanone and cyclohexanone; esters such as ethyl acetate, propyl acetate or butyl acetate, formates, propionates or malonates; ethers such as ketone ethers, ester ethers, and dialkyl ethers such as diisopropyl ether, diethyl ether, dibutyl ether, diethylene glycol diethyl ether, and ethylene glycol diethyl ether; aliphatic and aromatic hydrocarbons such as toluene, xylene, heptane, octane, and also various petroleum fractions such as naphtha, white spirit, petroleum ether or benzine; halogenated hydrocarbons such as methylene chloride; and also N-alkylated lactams such as, for example, N-methylpyrrolidone, N-cyclohexylpyrrolidone or N-dodecylpyrrolidone;
- further catalysts customary in polyurethane chemistry;
- reactive diluents and crosslinkers, examples being polyisocyanates such as MDI, PMDI, TDI, HDI, 1,12-dodecamethylene diisocyanate, cyclohexane 1,3- or 1,4-diisocyanate, IPDI, perhydro-2,4'- and -4,4'-diphenylmethane diisocyanate, 1,3- and 1,4-tetramethylxylylene diisocyanate, oligomers and polymers of these polyisocyanates, more particularly isocyanurates, carbodiimides, uretonimines, biurets, allophanates, and iminooxadiazinediones of the stated polyisocyanates, adducts of polyisocyanates with short-chain polyols, and also adipic dihydrazide and other dihydrazides;
- drying agents, such as, for example, p-tosyl isocyanate and other reactive isocyanates, orthoformic esters, calcium oxide; vinyltrimethoxysilane or other rapidly hydrolyzing silanes such as, for example, organoalkoxysilanes which have a functional group positioned a to the silane group, or molecular sieves;
- rheology modifiers such as, for example, thickeners, as for example urea compounds of the kind described on pages 9 to 11 of WO 02/48228 A2 as thixotropic agents ("Thixotropy endowning agent"), polyamide waxes, bentonites, or fumed silicas;
- adhesion promoters, more particularly silanes such as, for example, epoxysilanes, vinylsilanes, (meth)acrylosilanes, isocyanatosilanes, carbamato-silanes, S-(alkylcarbonyl)mercaptosilanes, and aldiminosilanes, and also oligomeric forms of these silanes;
- stabilizers to counter heat, light radiation, and UV radiation; flame retardants;
- surface-active substances such as, for example, wetting agents, flow control agents, deaerating agents or defoamers;
- biocides such as, for example, algicides, fungicides or fungal growth inhibitors;

and also further substances customarily employed in one-pack, isocyanate-containing compositions, as for example fibers, of polyethylene, for example; dyes, pigments, or other additives known to a person skilled in the art.

Besides the rapeseed oil methyl ester, the composition of the invention preferably contains no other plasticizers. Most preferably the composition is phthalate-free.

In one particularly preferred embodiment the composition of the invention comprises:

a) 9 wt % to 16 wt % of at least one isocyanate-functional polymer,
b) 10 wt % to 12 wt % of rapeseed oil methyl ester,
c) 70 wt % to 77 wt % of at least one kind of chalk, more particularly an uncoated chalk,
d) 0 wt % to 2 wt % of at least one latent curing agent, more particularly an aldimine,
e) 0 wt % to 0.5 wt % of at least one catalyst, and
f) 0 wt % to 2 wt % of at least one drying agent, based on the overall composition.

A composition of this kind is suitable, for example, as wood flooring adhesive or as elastic sealant, in joints, for example, since it has a relatively high elongation at break which is necessary for such applications.

It is advantageous for all of the stated constituents optionally present in the composition, more particularly filler and catalyst system and/or accelerator system, to be selected such that the storage stability of the composition is not adversely affected by the presence of such a constituent; in other words, such that the composition undergoes no change, or no substantial change, in its properties, particularly its application properties and curing properties, in the course of storage. This means that reactions leading to the chemical curing of the composition described, particularly the hydrolysis of any latent amines present or the reaction of isocyanates with water, and also subsequent amine-isocyanate addition reaction, do not occur to a significant extent in the course of storage. The storage stability is determined customarily by the measurement of the viscosity or of the extrusion force. It is therefore especially advantageous for the stated constituents not to contain any water, or to contain no more than traces of water, or not to release the same in the course of storage. It may therefore be advisable for certain constituents to be dried chemically or physically before being mixed into the composition.

Under the influence of moisture as for example on contact with humid air or following the admixing of water, or on strong heating, or under the influence of UV radiation, or under the influence of a combination of these factors, the composition of the invention undergoes curing, accompanied by crosslinking of the isocyanate-functional polymers (either via hydrolysis of the latent curing agents or through water-mediated formation of amines from a portion of the isocyanates, with subsequent amine-isocyanate addition reaction) rapidly. When a latent curing agent is used, full curing proceeds largely without bubbles being formed, since some or all of the isocyanate groups react, for example, with the hydrolyzing aldimino groups, with little or no $CO_2$ at all being formed. Curing is additionally accelerated by the presence of catalysts for the hydrolysis of the latent curing agents, examples being the organic carboxylic acids or sulfonic acids already stated, without any significant formation of bubbles. The moisture that is needed for curing may come from the air (atmospheric humidity), in which case the composition cures through the diffusion of the moisture from the outside inward. Alternatively the composition may be contacted with a water-containing component, by spreading, for example, with a smoothing agent, for example, or by spraying, or by means of immersion methods, or a water-containing component may be added to the composition, in the form, for example, of a water-containing paste, which is mixed homogeneously or heterogeneously with the composition by way of a static mixer, for example.

The present invention further encompasses the use of an above-described composition as a moisture-curing adhesive, sealant or coating. The composition of the invention is suitable particularly for application to concrete, mortar, brick, tile, plaster, a natural stone such as granite or marble, glass, glass-ceramic, metal or metal alloy, wood, plastic, and paint.

The composition is used preferably as wood flooring adhesive, as for example for solid wood flooring, plank wood flooring (tongue and groove), laminate wood flooring, industrial wood flooring, boards, mosaic wood flooring, wood tiles, and wood chipboard panels, preferably for full-area adhesive bonding. Likewise preferred is the use of the composition as sealant, as for example for connecting joints or movement joints.

The composition of the invention preferably has a paste-like consistency with properties of structural viscosity. A composition of this kind is applied to the substrate by means of a suitable apparatus, as for example from a cartridge or by means of a toothed applicator from a larger container. A composition of the invention having good application properties preferably has high sag resistance and short stringing, and also low viscosity/extrusion force. This means that it can be spread with the toothed applicator with little force, remains standing in the form applied after application, hence does not disperse, and forms no string or only a very short string when the application equipment is removed, so that the substrate is not soiled.

In particular, the composition of the invention has a low extrusion force, measured according to the method described later on below (see Examples) after conditioning at 23° C. for 24 h. In one preferred embodiment the measured extrusion force is ≤1600 N, in a most-preferred embodiment ≤1000 N.

The composition of the invention is applied in particular in a temperature range between 5 and 45° C., preferably in the region of the room temperature, and also cures fully under these conditions.

The invention further relates to a fully cured composition which is obtainable from a composition as described above after curing thereof with water, more particularly in the form of atmospheric humidity.

The articles which are adhesively bonded, sealed or coated with a composition of the invention are more particularly an edifice, more particularly an edifice in structural or civil engineering, an industrially manufactured product or a consumer product, more particularly a window, a household appliance, or a means of transport or ancillary component of a means of transport.

EXAMPLES

Set out below are working examples which are intended to elucidate in more detail the invention described. The invention is of course not confined to these working examples described.

Test Methods

The tensile strength and the elongation at break were determined according to DIN 53504 (tensioning rate: 200 mm/min) on films with a layer thickness of 2 mm that have been cured for 7 days at 23° C. and 50% relative humidity.

The Shore A hardness was determined according to DIN 53505, on specimens with a layer thickness of 6 mm that have been cured for 7 days at 23° C. and 50% relative humidity.

The skin-over time (time to absence of tack, "tack-free time") was determined at 23° C. and 50% relative humidity. For the determination of the skin-over time, a small portion of the adhesive at room temperature was applied to cardboard, in a layer thickness of approximately 2 mm, and a determination was made of the time until the surface of the adhesive first no longer left any residues on a finger used to lightly press the surface of the adhesive.

For the determination of the extrusion force, the compositions were dispensed into internally coated aluminum cartridges (outer diameter 46.9 mm, inner diameter 46.2 mm, length 215 mm, metric ISO thread M15×1.5 mm) and given an airtight seal with a polyethylene stopper (diameter 46.1 mm) from Novelis Deutschland GmbH. After conditioning at 23° C. for 24 hours, the cartridges were opened and the contents extruded using an extrusion device. For this purpose, a nozzle with a 2 mm inside-diameter opening was screwed onto the cartridge thread. Using an extrusion device (Zwick/Roell Z005), a determination was made of the force needed to extrude the composition at an extrusion rate of 60 mm/min. The figure reported is an average value of the forces measured after an extrusion distance of 22 mm, 24 mm, 26 mm, and 28 mm. After an extrusion distance of 30 mm, measurement was halted.

A second measurement series was implemented following storage of identical cartridges at 60° C. for 7 days each, followed by cooling of the cartridges to room temperature. These measurements for the extrusion force were carried out subsequently in the same procedure as for the first measurement series. This second measurement series was used to estimate the storage stability of the compositions.

Preparation of Isocyanate-Functional Polymer P-1

Under a nitrogen atmosphere, 5687 g of Acclaim® 4200 polyol (Bayer MaterialScience AG, Germany), 712 g of Desmodur 44 MC L (Bayer MaterialScience AG, Germany), and 0.6 g of DABCO 33 LV (Air Products & Chemicals Inc., USA) were heated to 80° C. with continual stirring and were left at this temperature. After a reaction time of an hour, the free isocyanate groups content was found by titration to be 1.9 wt %.

Preparation of Aldimine A-1

Under a nitrogen atmosphere, 101.8 g (0.36 mol) of 2,2-dimethyl-3-lauryloxy-propanol, purified by distillation, were introduced into a round-bottom flask. With vigorous stirring, 20.0 g (0.35 mol of N) of 1,6-hexamethylenediamine (BASF; amine content 17.04 mmol N/g) were slowly added from a heated dropping funnel. In the course of the addition, the reaction mixture warmed up and turned increasingly cloudy. Following complete addition of the amine, the volatile reaction products were removed under reduced pressure (10 mbar, 80° C.), to give 115.4 g of a pale yellow oil having an amine content of 2.94 mmol N/g.

Production of Compositions Z-1 to Z-8

A vacuum mixer was charged, in accordance with the parts by weight (wt %) reported in table 1, with 3530 g of dried Omyacarb® 40 GU chalk (Omya AG, Switzerland) with 500 g of the respective plasticizer (e.g., rapeseed oil methyl ester for example 1; see table 2 for a detailed list of the plasticizers used). Then 355 g of polymer P-1 were added, followed by 50 g of Additive TI (OMG Borchers GmbH, Germany) and 50 g of Desmodur CD-L (Bayer MaterialScience AG, Germany). Subsequently a further 400 g of polymer P-1 were added, followed by 100 g of aldimine A-1. Lastly 14 g of salicylic acid (5 wt % in DOA; DOA=bis(2-ethylhexyl) adipate; e.g., Eastman Chemical Company, USA) and 1 g of dibutyltin dilaurate (e.g.: Jacobson Chemicals Ltd., UK) were added. The mixer was closed and stirring took place under reduced pressure at 1000-1200 revolutions for 20 minutes, with processing to form a homogeneous paste having a total mass of 5000 g. This paste was then dispensed into internally coated aluminum gun-application cartridges.

TABLE 1

Ingredients in parts by weight (wt %) of the inventive composition Z-1 and of the reference compositions Z-2 to Z-8.

|  | Z-1 | Z-2 | Z-3 | Z-4 | Z-5 | Z-6 | Z-7 | Z-8 |
|---|---|---|---|---|---|---|---|---|
| Omyacarb 40 GU | 70.6 | 70.6 | 70.6 | 70.6 | 70.6 | 70.6 | 70.6 | 70.6 |
| Polymer P-1 | 15.1 | 15.1 | 15.1 | 15.1 | 15.1 | 15.1 | 15.1 | 15.1 |
| Rapeseed oil methyl ester | 10 | | | | | | | |
| DIDP | | 10 | | | | | | |
| DOA | | | 10 | | | | | |
| EME-100 | | | | 10 | | | | |
| ETO-100 | | | | | 10 | | | |
| SNS-100 | | | | | | 10 | | |
| Hexamoll DINCH | | | | | | | 10 | |
| Mesamoll | | | | | | | | 10 |
| Aldimine A-1 | 2 | 2 | 2 | 2 | 2 | 2 | 2 | 2 |
| Additive TI | 1 | 1 | 1 | 1 | 1 | 1 | 1 | 1 |
| Desmodur CD-L | 1 | 1 | 1 | 1 | 1 | 1 | 1 | 1 |
| DBTL | 0.02 | 0.02 | 0.02 | 0.02 | 0.02 | 0.02 | 0.02 | 0.02 |
| Salicylic acid (5% in DOA) | 0.28 | 0.28 | 0.28 | 0.28 | 0.28 | 0.28 | 0.28 | 0.28 |

TABLE 2

Plasticizers used for producing compositions Z-1 to Z-8 by above production method.

|  | Plasticizer | Manufacturer |
|---|---|---|
| Z-1 | Rapeseed oil methyl ester (RME) | Oleon N.V., Belgium |
| Z-2 | DIDP (diisodecyl phthalate) | ExxonMobil, USA |
| Z-3 | DOA (bis(2-ethylhexyl) adipate) | Eastman Chem., USA |
| Z-4 | EME-100 (soybean methyl ester-based) | Chimista Specialty Chem, USA |
| Z-5 | ETO-100 (pine oil ester-based) | Chimista Specialty Chem, USA |
| Z-6 | SNS-100 (castor oil-based) | Chimista Specialty Chem, USA |
| Z-7 | Hexamoll® DINCH® | BASF SE, Germany |
| Z-8 | Mesamoll® | Lanxess AG, Germany |

TABLE 3

Test results of inventive composition Z-1 and of reference compositions Z-2 to Z-8 according to the methods described earlier on above.

|  | Z-1 | Z-2 | Z-3 | Z-4 | Z-5 | Z-6 | Z-7 | Z-8 |
|---|---|---|---|---|---|---|---|---|
| Tensile strength [MPa] | 0.61 | 0.86 | 0.98 | 0.57 | 0.63 | 0.87 | 0.95 | 0.94 |
| Elongation at break [%] | 308 | 112 | 78 | 56 | 310 | 87 | 76 | 94 |
| Shore A | 49 | 56 | 60 | 50 | 53 | 57 | 58 | 58 |
| Skin-over time [min] | 13 | 15 | 18 | 12 | 7 | 15 | 16 | 16 |
| Extrusion force [N] 1 d RT (2 mm) | 858 | 2401 | 1527 | 1547 | 2370 | 2615 | 2118 | 2300 |
| Extrusion force [N] 7 d 60° C. (2 mm) | 819 | 2600 | 1450 | 1903 | >3200 | 2709 | 2216 | >3200 |

The inventive example Z-1 (see table 3) shows clearly that using rapeseed oil methyl ester as plasticizer in highly filled compositions with more than 70 wt % of filler, the extrusion force is well below 1000 N, even after storage of the cartridge at 60° C. for 7 days, which also suggests good storage stability. In comparison to this, all of reference examples Z-2 to Z-8 exhibit a much higher extrusion force, both in the fresh condition and after storage at 60° C. For a user-friendly product, however, extrusion forces as low as possible are desirable. At the same time, it is clear from the data in table 3 that the inventive composition Z-1 in the cured state, in terms of mechanical values (tensile strength, elongation at break, Shore A), suggests a suitability as adhesive and sealant.

Production of Compositions Z-9 to Z-14

These inventive compositions were produced while varying the quantity of filler, the quantity of the rapeseed oil methyl ester and/or of the polymer P-1. The overall mass of the individual compositions, however, was likewise adjusted to 5000 g in each case. A vacuum mixer was charged, in accordance with the parts by weight (wt %) recorded in table 4, with dried Omyacarb® 40 GU chalk (Omya AG, Switzerland) with rapeseed oil methyl ester. Then in each case half of polymer P-1 was added, followed by 50 g of additive TI (OMG Borchers GmbH, Germany) and 50 g of Desmodur CD-L (Bayer MaterialScience AG, Germany). Thereafter the second half of polymer P-1 was added, followed by 100 g of aldimine A-1. Lastly, 14 g of salicylic acid (5 wt % in DOA; DOA=bis(2-ethylhexyl) adipate; e.g., Eastman Chemical Company, USA) and 1 g of dibutyltin dilaurate (e.g.: Jacobson Chemicals Ltd., UK) were added. The mixer was closed and the contents were stirred under reduced pressure at 1000-1200 revolutions for 20 minutes and processed to give a homogeneous paste having a total mass of 5000 g. This paste was then dispensed into internally coated aluminum gun-application cartridges.

TABLE 4

Ingredients in parts by weight (wt %) of inventive compositions
Z-9 to Z-14 and results of the measurements for extrusion force,
in accordance with the method described earlier on above.

|  | Z-9 | Z-10 | Z-11 | Z-12 | Z-13 | Z-14 |
| --- | --- | --- | --- | --- | --- | --- |
| Omyacarb 40 GU | 70.6 | 70.6 | 70.6 | 72.6 | 74.6 | 76.6 |
| Polymer P-1 | 16.1 | 17.1 | 18.1 | 13.1 | 11.1 | 9.1 |
| Rapeseed oil methyl ester | 9 | 8 | 7 | 10 | 10 | 10 |
| Aldimine A-1 | 2 | 2 | 2 | 2 | 2 | 2 |
| Additive TI | 1 | 1 | 1 | 1 | 1 | 1 |
| Desmodur CD-L | 1 | 1 | 1 | 1 | 1 | 1 |
| DBTL | 0.02 | 0.02 | 0.02 | 0.02 | 0.02 | 0.02 |
| Salicylic acid (5% in DOA) | 0.28 | 0.28 | 0.28 | 0.28 | 0.28 | 0.28 |
| Extrusion force [N] 1 d RT (2 mm) | 982 | 1241 | 1590 | 866 | 907 | 994 |
| Extrusion force [N] 7 d 60° C. (2 mm) | 985 | 1232 | 1482 | 960 | 1089 | 1110 |

The inventive compositions Z-9 to Z-14 (see table 4) show the influence of the individual constituents on the extrusion force. Composition Z-14 in particular, with 76.6 wt % of chalk, based on the overall composition, exhibits strikingly low extrusion forces in view of the high filler content.

The invention claimed is:

1. A moisture-curing composition comprising
   a) 5 wt % to 20 wt % of at least one isocyanate-functional polymer,
   b) 7 wt % to 20 wt % of rapeseed oil methyl ester, and
   c) 70 wt % to 88 wt % of at least one filler,
   based on the overall composition.

2. The moisture-curing composition as claimed in claim 1, wherein the at least one isocyanate-functional polymer is included with a fraction of 7 wt % to 20 wt %, based on the overall composition.

3. The moisture-curing composition as claimed in claim 1, wherein rapeseed oil methyl ester is included with a fraction of 8 wt % to 18 wt %, based on the overall composition.

4. The moisture-curing composition as claimed in claim 1, wherein the at least one filler is included with a fraction of 70 wt % to 80 wt %, based on the overall composition.

5. The moisture-curing composition as claimed in claim 1, wherein the at least one filler comprises a chalk.

6. The moisture-curing composition as claimed in claim 1, wherein the composition additionally comprises at least one latent curing agent, and/or at least one drying agent, and/or at least one catalyst, in a total fraction of ≤5 wt %, based on the overall composition.

7. The moisture-curing composition as claimed in claim 1, comprising
   a) 9 wt % to 16 wt % of at least one isocyanate-functional polymer,
   b) 10 wt % to 12 wt % of rapeseed oil methyl ester,
   c) 70 wt % to 77 wt % of at least one chalk,
   d) 0 wt % to 2 wt % of at least one latent curing agent,
   e) 0 wt % to 0.5 wt % of at least one catalyst, and
   f) 0 wt % to 2 wt % of at least one drying agent,
   based on the overall composition.

8. The moisture-curing composition as claimed in claim 1, wherein the composition before curing and after conditioning at 23° C. for 24 h has an extrusion force of ≤1600 N.

9. An adhesive, sealant or coating comprising the moisture-curing composition as claimed in claim 1.

10. A wood flooring adhesive comprising the moisture-curing composition as claimed in claim 1.

11. A sealant for joints comprising the moisture-curing composition as claimed in claim 1.

12. A fully cured composition obtained from a composition as claimed in claim 1 after curing thereof with water.

13. The moisture-curing composition as claimed in claim 1, wherein the at least one isocyanate-functional polymer has a remaining free isocyanate group content of from 0.1 to 5 wt %.

14. The moisture-curing composition as claimed in claim 1, wherein the rapeseed oil methyl ester acts as a plasticizer, and the composition contains no other plasticizer.

15. The moisture-curing composition as claimed in claim 1, wherein the the composition before curing and after conditioning at 23° C. for 24 h has an extrusion force of ≤1000 N.

* * * * *